United States Patent
Galehouse (10) Patent No.: US 10,794,422 B1
(45) Date of Patent: Oct. 6, 2020

(54) SYSTEM AND METHOD FOR ASSEMBLING A SLEWING RING BEARING WITH A PREDETERMINED PRELOAD

(71) Applicant: General Electric Company, Schenectady, NY (US)

(72) Inventor: Martin Scott Galehouse, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/419,552

(22) Filed: May 22, 2019

(51) Int. Cl.
    *F16C 25/06* (2006.01)
    *F16C 25/08* (2006.01)
    *F16C 19/08* (2006.01)
    *F03D 80/70* (2016.01)

(52) U.S. Cl.
    CPC ............ *F16C 25/083* (2013.01); *F03D 80/70* (2016.05); *F16C 19/08* (2013.01); *F16C 2229/00* (2013.01); *F16C 2360/31* (2013.01)

(58) Field of Classification Search
CPC .... F16C 19/181; F16C 19/182; F16C 19/183; F16C 19/38; F16C 19/54; F16C 19/541; F16C 19/542; F16C 33/60; F16C 2229/00; F16C 2300/14; F16C 2300/236; F16C 2300/31; F16C 25/06; F03D 80/70
See application file for complete search history.

(56) References Cited

U.S. PATENT DOCUMENTS

| | | | | |
|---|---|---|---|---|
| 3,651,550 A * | 3/1972 | Bennett | .................... | F16C 25/06 29/898.09 |
| 4,400,042 A * | 8/1983 | Fritz | ....................... | F16C 19/14 384/615 |
| 4,657,412 A | 4/1987 | McLarty et al. | | |
| 5,090,852 A * | 2/1992 | Dixon | ..................... | F16B 19/05 411/361 |
| 5,376,200 A * | 12/1994 | Hall | ....................... | B29C 53/566 156/169 |
| 6,269,711 B1 * | 8/2001 | Tejima | .................. | F16H 49/001 384/512 |
| 2010/0215307 A1 * | 8/2010 | Loeschner | .............. | F03D 80/70 384/571 |
| 2010/0244454 A1 * | 9/2010 | Loeschner | .............. | F03D 15/10 290/55 |
| 2011/0162174 A1 * | 7/2011 | Liesegang | ............. | F16C 35/078 24/457 |
| 2012/0237152 A1 * | 9/2012 | Wheals | ................... | F16C 25/06 384/548 |

(Continued)

FOREIGN PATENT DOCUMENTS

DE    102011085258 A1 *   5/2013   ............ F16C 19/386
EP    2443355 A1   4/2012

*Primary Examiner* — Phillip A Johnson
(74) *Attorney, Agent, or Firm* — Dority & Manning, P.A.

(57) ABSTRACT

A slewing ring bearing includes an outer race and an inner race rotatable relative to the outer race. At least one of the outer race or the inner race is split into a first portion and a separate, second portion. The slewing ring bearing also has a plurality of roller elements arranged between one or more raceways defined by the inner and outer races. The first and second portions of at least one of the inner or outer races are coupled together via a threaded interface therebetween so as to establish a predetermined preload for the slewing ring bearing.

20 Claims, 9 Drawing Sheets

(56) References Cited

U.S. PATENT DOCUMENTS

| | | | |
|---|---|---|---|
| 2015/0211624 A1* | 7/2015 | Pasaribu | F16C 33/6633 |
| | | | 74/416 |
| 2015/0285308 A1* | 10/2015 | Kanamoto | F16C 19/184 |
| | | | 384/504 |
| 2016/0186808 A1 | 6/2016 | Hestermann | |
| 2017/0254359 A1* | 9/2017 | Maiwa | F16C 19/184 |
| 2018/0080498 A1* | 3/2018 | Murray | F16C 25/06 |

* cited by examiner

SYSTEM AND METHOD FOR ASSEMBLING A SLEWING RING BEARING WITH A PREDETERMINED PRELOAD

FIELD

The present disclosure relates in general to wind turbines, and more particularly to systems and methods for assembling a slewing ring bearing with a predetermined preload.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate support frame located within the nacelle. More specifically, in many wind turbines, the gearbox is mounted to the bedplate via one or more torque arms or arms. The one or more rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

Further, wind turbines may include various slewing ring bearings to facilitate rotation of their various components. Examples of such slewing ring bearings may include a pitch bearing and a yaw bearing. More specifically, yaw bearings are configured to rotate the nacelle with respect to the tower as a function of incoming wind. In addition, pitch bearings are arranged between a blade root of the rotor blades and the hub to facilitate rotation of the rotor blades with respect to the incoming wind.

Such bearings generally include an outer race, an inner race rotatable relative to the outer race, and a plurality of rolling elements therebetween. In addition, the bearings are typically assembled in such a way that a certain amount of clearance exists between the rolling elements and the raceways. This clearance is known as "play" or "slop" and may allow the races to misalign or the rolling elements to slide, rather than roll. As such, the performance of the bearing generally decreases as the amount of play increases. In particular, an increase in the amount of play, typically, reduces the amount of load which may be applied to the bearing without detrimental effects.

A known method for limiting the detrimental effects of play is to apply a bearing preload. The purpose of the preload is to reduce or eliminate the amount of play in the bearing by subjecting the rolling elements to an axial load in advance of receiving the operating load. Using known methods, it is typically difficult to obtain the proper degree of preload at all points along the circumference of the bearing.

In view of the aforementioned issues, the art is continuously seeking new and improved systems and methods for quickly applying a predictable and consistent preload to a bearing. Thus, a system and method for assembling a slewing ring bearing with a predetermined preload would be advantageous.

BRIEF DESCRIPTION

Aspects and advantages of the invention will be set forth in part in the following description, or may be obvious from the description, or may be learned through practice of the invention.

In one aspect, the present disclosure is directed to a slewing ring bearing. The slewing ring bearing may have an outer race and an inner race rotatable relative to the outer race. The slewing ring bearing may also include a plurality of roller elements arranged between one or more raceways defined by the inner and/or the outer races. At least one of the outer race or the inner race may be split into a first portion and a separate, second portion. The first and second portions of at least one of the outer race or the inner race may be coupled together via a threaded interface therebetween so as to establish a predetermined preload for the slewing ring bearing.

In an embodiment, the one or more raceways may be asymmetric raceways.

Additionally, in an embodiment, the plurality of roller elements may also include a first row of roller elements and a second row of roller elements. In an embodiment, the first and second rows of roller elements define first and second contact angles, respectively. The first and second contact angles may be established by a design contact angle of the asymmetric raceway(s).

In an embodiment, the magnitude of the predetermined preload may be established by a separation between the first and second portions of at least one of the outer race or the inner race along a preload interface. In addition, the magnitude of the predetermined preload may define a bearing stiffness.

In an additional embodiment, the predetermined preload may be a maximal-predetermined preload when the first and second portions of the outer race and/or the inner race are in contact along the preload interface.

In a further embodiment, the slewing ring bearing may include a spacer positioned between the first and second portions of the outer race and/or the inner race so as to establish a mechanical limit between the first and second portions along the preload interface.

In an embodiment, the threaded interface may be located in a lower-stress region of the outer or inner race having a stress concentration which is less than 95% of a maximal stress of the respective race.

In an additional embodiment, the threaded interface may be defined by a plurality of threads. In one embodiment, the plurality of threads may include a plurality of arcuate threads. In an embodiment, the threaded interface may include a stress concentration factor of less than or equal to 4.0.

In a further embodiment, the slewing ring bearing may be at least one of a pitch bearing or a yaw bearing of a wind turbine.

In another aspect, the present disclosure is directed to a method for assembling a slewing ring bearing with a predetermined preload. The method may include providing an outer race of the slewing ring bearing and arranging an inner race of the slewing ring bearing radially inward of the outer race. At least one of the outer race or the inner race may be split into a first portion and a separate, second portion. The method may include coupling the first and second portions of at least one of the outer race or the inner race together by engaging a threaded interface between the first and second portions so as to provide the predetermined preload to the slewing ring bearing. Additionally, the method may also include placing a plurality of roller elements within one or more raceways defined by the inner race and the outer race.

In an embodiment, the method may also include ensuring the predetermined preload is within a specified design limit for the slewing ring bearing.

In an additional embodiment, the method may include rotating at least one of the first portion or the second portion with respect to the other so as to advance at least one of the first portion or the second portion along the threaded interface so as to reduce a separation between the first and second portions. In an embodiment, rotating the first portion and/or the second portion with respect to the other may also include rotating the first portion and/or the second portion at least 45° but less than or equal to 1440°. In a further embodiment, rotating the first portion and/or the second portion with respect to the other may also include engaging a toothed gear of the first portion and/or the second portion with a pinion drive so as to apply a radial torque thereto.

In an embodiment, the method may also include establishing first and second contact angles, respectively, for the first and second rows of roller elements. In an additional embodiment, the method may also include establishing a contact stress between the first and second row of roller elements and the one or more raceways of less than or equal to two (2) gigapascals (GPa).

In another aspect, the present disclosure is directed to a wind turbine. The wind turbine may include a tower, a nacelle mounted atop the tower, and a rotor mounted to the nacelle. The rotor may include a rotatable hub having one or more rotor blades secured thereto. The wind turbine may include at least one slewing ring bearing arranged between at least one of the tower and the nacelle or the hub and one of the one or more rotor blades. The slewing ring bearing may include an outer race and an inner race rotatable relative to the outer race. At least one of the outer race or the inner race may be split into a first portion and a separate, second portion. The slewing ring bearing may also include a plurality of roller elements arranged between one or more raceways defined by the inner and outer races. The first and second portions of the outer race and/or the inner race may be coupled together via a threaded interface therebetween so as to establish a predetermined preload for the slewing ring bearing.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a slewing ring bearing with a predetermined preload. The slewing ring bearing may include an outer race and an inner race rotatable relative to the outer race. At least one of the outer race or the inner race may include a threaded interface which joins a first portion and a separate, second portion thereof. A plurality of roller elements may be arranged between one or more raceways defined by the inner and outer races. A contact stress (e.g., a preload) between the roller elements and the raceways may be established by fixing either the first portion or the second portion and rotating the other so as to engage the threaded portion and draw the first and second portions together. The magnitude of the contact stress may be determined by a distance between the first and second portions. As such, the contact stress, or preload, may be at a maximum when the first and second portions are in contact along a preload interface. In other words, as either the first portion or the second portion is screwed into the other portion, the magnitude of the stress may increase up to a maximum (i.e. no more torque may be applied).

Figure 1:
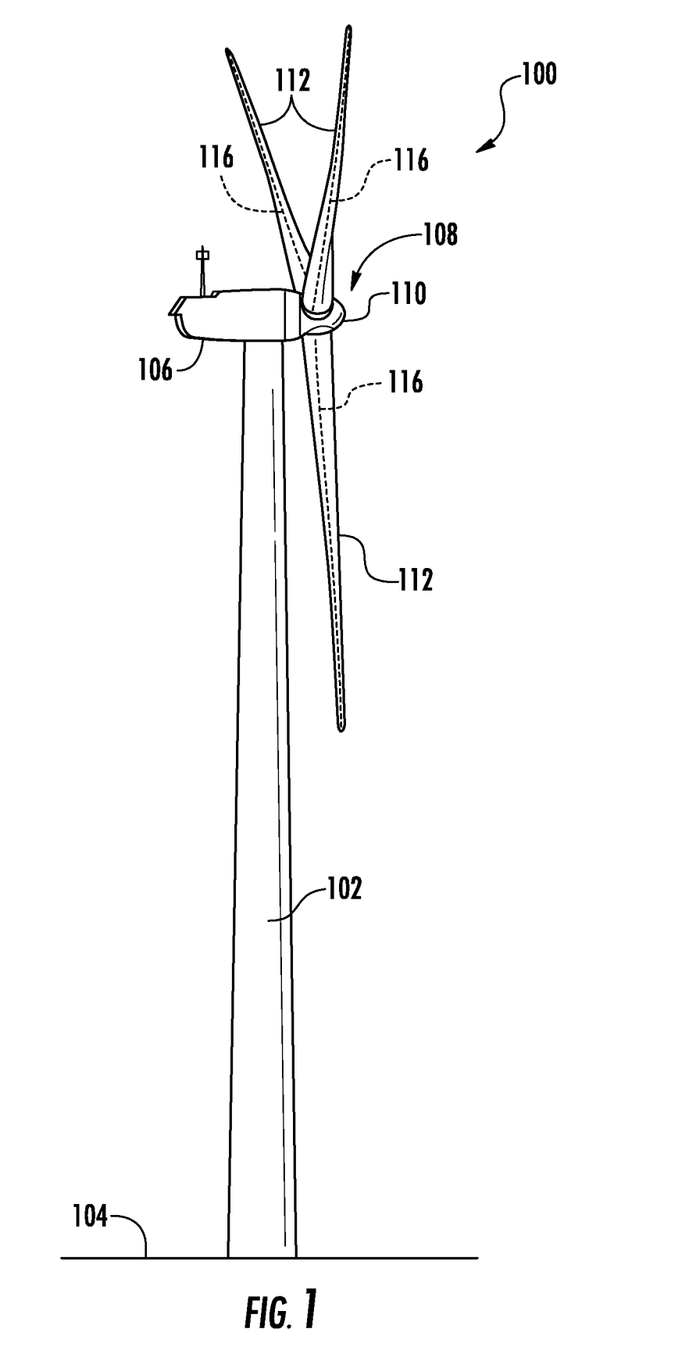
FIG. 1 illustrates a perspective view of one embodiment of a wind turbine according to the present disclosure.

Referring now to the drawings, FIG. 1 illustrates a perspective view of one embodiment of a wind turbine 100 according to the present disclosure. As shown, the wind turbine 100 generally includes a tower 102 extending from a support surface 104, a nacelle 106 mounted on the tower 102, and a rotor 108 coupled to the nacelle 106. The rotor 108 includes a rotatable hub 110 and at least one rotor blade 112 coupled to and extending outwardly from the hub 110. For example, in the illustrated embodiment, the rotor 108 includes three rotor blades 112. However, in an alternative embodiment, the rotor 108 may include more or less than three rotor blades 112. Each rotor blade 112 may be spaced about the hub 110 to facilitate rotating the rotor 108 to enable kinetic energy to be transferred from the wind into usable mechanical energy, and subsequently, electrical energy. For instance, the hub 110 may be rotatably coupled to an electric generator 118 (FIG. 2) positioned within the nacelle 106 to permit electrical energy to be produced.

Figure 2:
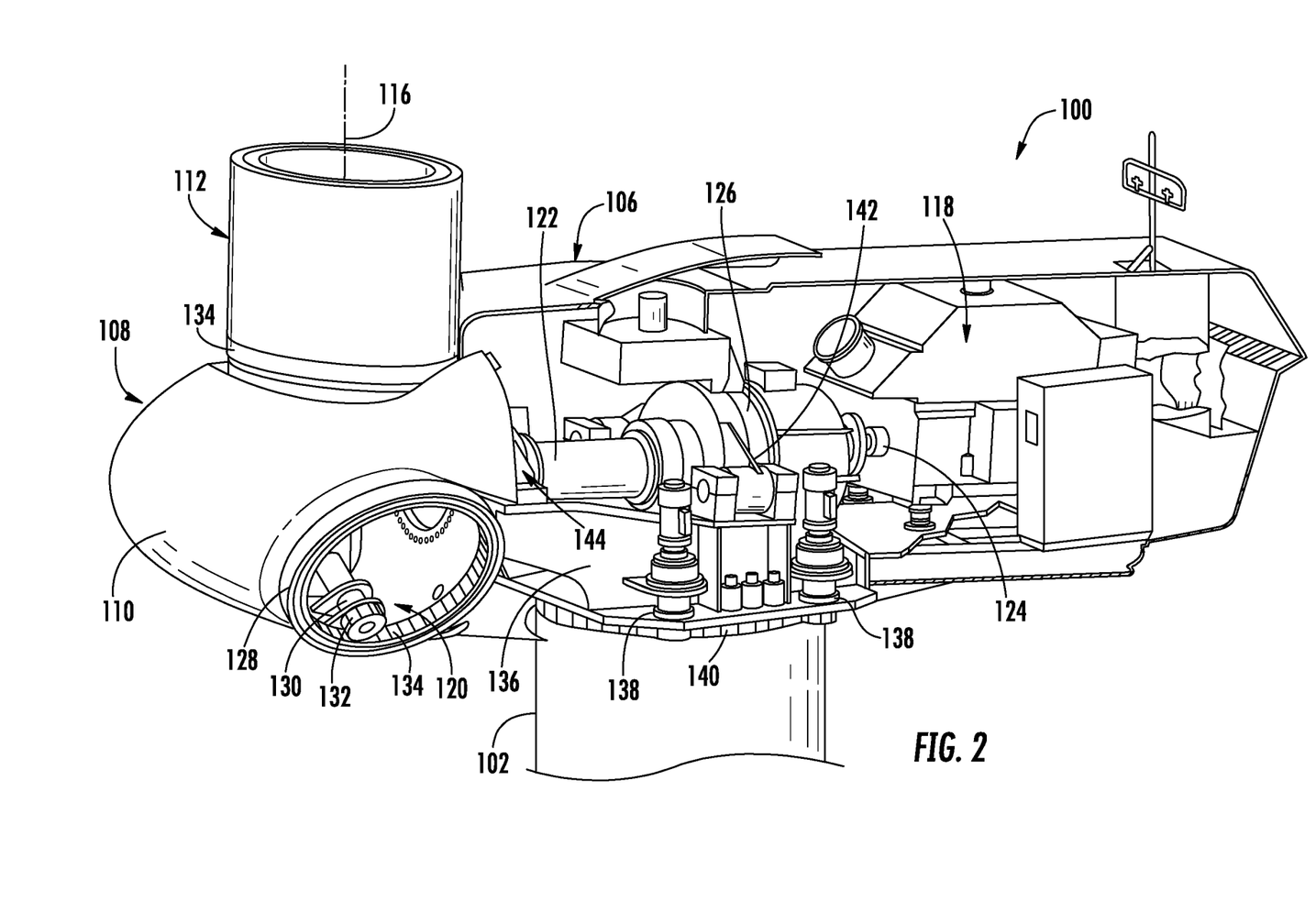
FIG. 2 illustrates a perspective view of one embodiment of a simplified, internal view of one embodiment of a nacelle of a wind turbine according to the present disclosure.

Referring now to FIG. 2, a simplified, internal view of one embodiment of the nacelle 106 of the wind turbine 100 shown in FIG. 1 is illustrated. As shown, the generator 118 may be coupled to the rotor 108 for producing electrical power from the rotational energy generated by the rotor 108. For example, as shown in the illustrated embodiment, the rotor 108 may include a rotor shaft 122 coupled to the hub 110 for rotation therewith. The rotor shaft 122 may be rotatably supported by a main bearing 144. The rotor shaft 122 may, in turn, be rotatably coupled to a generator shaft 124 of the generator 118 through a gearbox 126 connected to a bedplate support frame 136 by one or more torque arms 142. As is generally understood, the rotor shaft 122 may provide a low speed, high torque input to the gearbox 126 in response to rotation of the rotor blades 112 and the hub 110. The gearbox 126 may then be configured to convert the low speed, high torque input to a high speed, low torque output to drive the generator shaft 124 and, thus, the generator 118.

Each rotor blade 112 may also include a pitch adjustment mechanism 120 configured to rotate each rotor blade 112 about its pitch axis 116. Further, each pitch adjustment mechanism 120 may include a pitch drive motor 128 (e.g., any suitable electric, hydraulic, or pneumatic motor), a pitch drive gearbox 130, and a pitch drive pinion 132. In such embodiments, the pitch drive motor 128 may be coupled to the pitch drive gearbox 130 so that the pitch drive motor 128 imparts mechanical force to the pitch drive gearbox 130. Similarly, the pitch drive gearbox 130 may be coupled to the pitch drive pinion 132 for rotation therewith. The pitch drive pinion 132 may, in turn, be in rotational engagement with a pitch bearing 134 coupled between the hub 110 and a corresponding rotor blade 112 such that rotation of the pitch drive pinion 132 causes rotation of the pitch bearing 134. Thus, in such embodiments, rotation of the pitch drive motor 128 drives the pitch drive gearbox 130 and the pitch drive pinion 132, thereby rotating the pitch bearing 134 and the rotor blade 112 about the pitch axis 116. Similarly, the wind turbine 100 may include one or more yaw drive mechanisms 138 being configured to change the angle of the nacelle 106 relative to the wind (e.g., by engaging a yaw bearing 140 of the wind turbine 100).

Figure 3:
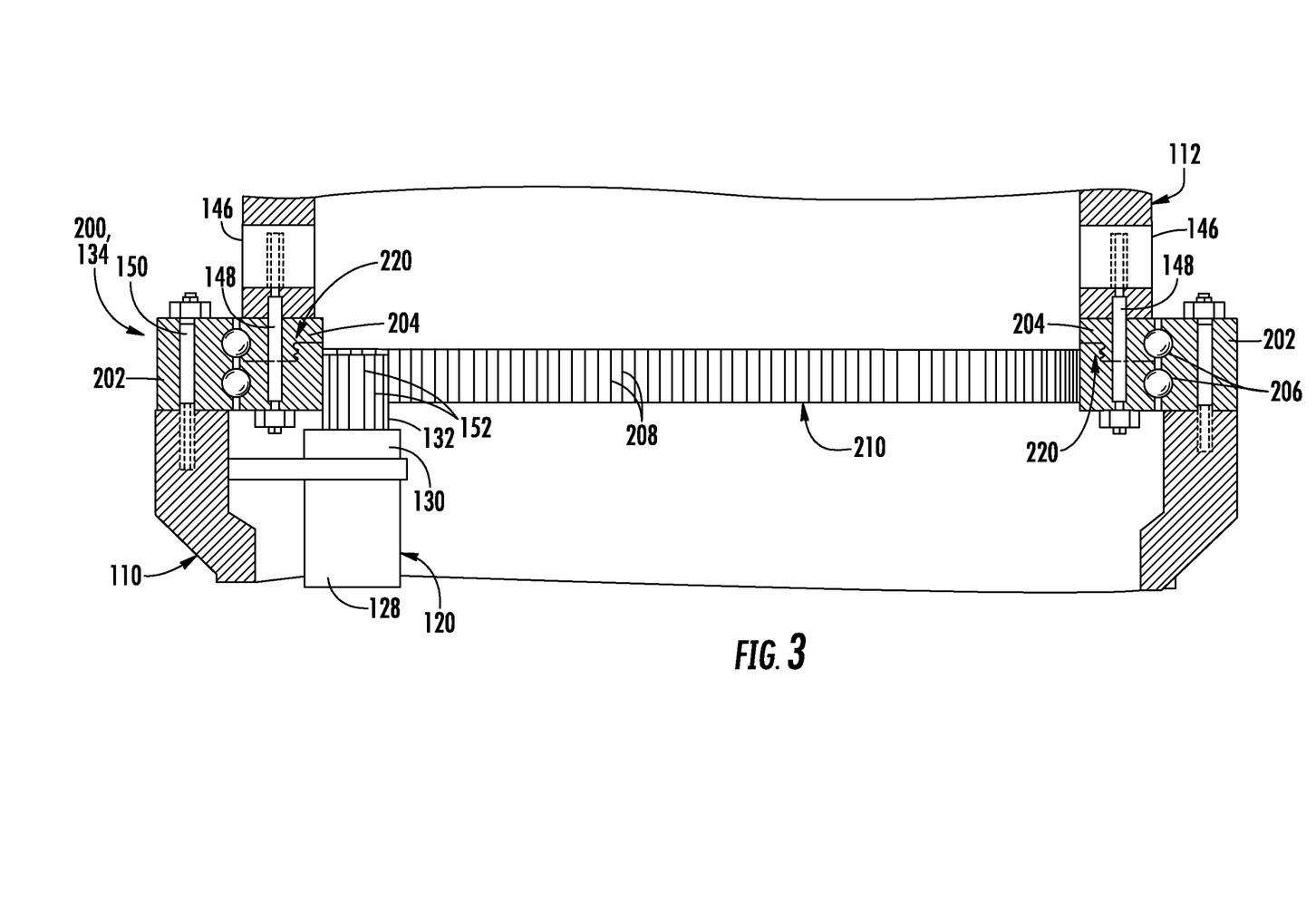
FIG. 3 illustrates a cross-sectional view of one embodiment of an interface between a rotor blade and a hub of a wind turbine according to the present disclosure, particularly illustrating a pitch bearing arranged therebetween.

Referring now to FIG. 3, a cross-sectional view of one embodiment of an interface between the rotor blade 112 and the hub 110 of the wind turbine 100 is depicted according to the present disclosure. As depicted, the rotor blade 112 may be secured to the hub 110 via one or more barrel nuts 146 mounted within a portion of a blade root of the rotor blade 112. In addition, as shown, a plurality of root bolts 148 may be coupled to, and extend from, the barrel nuts 146, and may be used to couple the blade root of the rotor blade 112 to the hub 110 through the pitch bearing 134.

In an embodiment, the pitch bearing 134 may be a slewing ring bearing 200. Thus, as shown, the pitch bearing 134 may include an outer bearing race 202, an inner bearing race 204, and a plurality of roller elements 206 (e.g., ball bearings) disposed between the outer and inner races 202, 204. The outer race 202 may be configured to be mounted to the hub 110 using a plurality of hub bolts 150 and/or other suitable fastening mechanisms. Similarly, the inner race 204 may be configured to be mounted to the rotor blade 112 using the plurality of root bolts 148.

Figure 4:
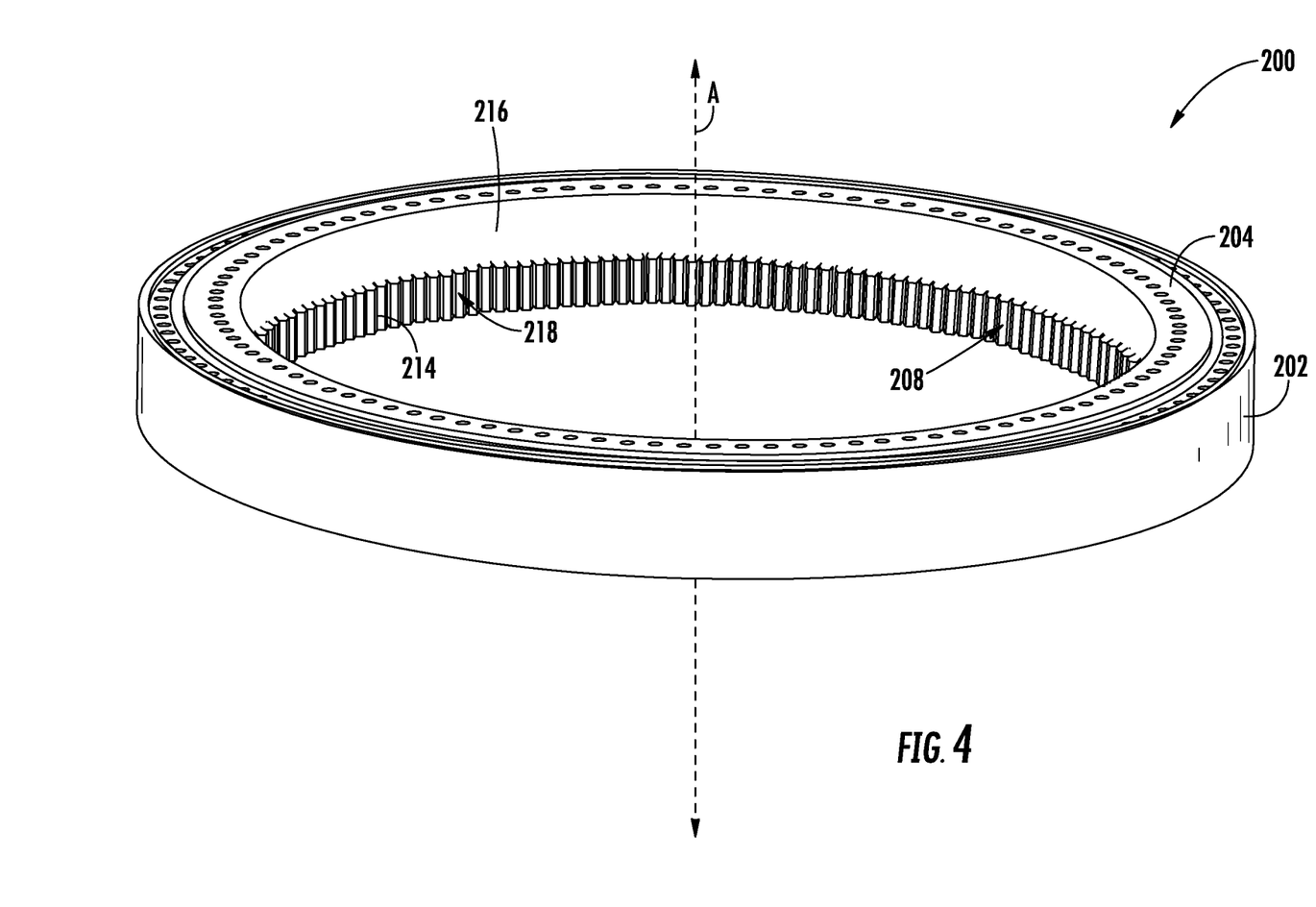
FIG. 4 illustrates a perspective view of one embodiment of a slewing ring bearing according to the present disclosure, particularly illustrating an inner race having a toothed gear portion.

As is generally understood, the inner race 204 may be configured to be rotated relative to the outer race 202 via the roller elements 206 to allow the pitch angle of each rotor blade 112 to be adjusted. As shown in FIGS. 2 and 3, such relative rotation of the outer and inner races 202, 204 may be achieved using the pitch adjustment mechanism 120 described herein. For example, as shown in FIGS. 3 and 4, a plurality of gear teeth 208 may be formed along the inner circumference 210 of the inner race 204. The gear teeth 208 may be configured to mesh with corresponding gear teeth 152 formed on the pitch drive pinion 132. Thus, due to meshing of the gear teeth 208, 152, rotation of the pitch drive pinion 132 results in rotation of the inner race 204 relative to the outer race 202 and, thus, rotation of the rotor blade 112 relative to the hub 110.

Figure 5:
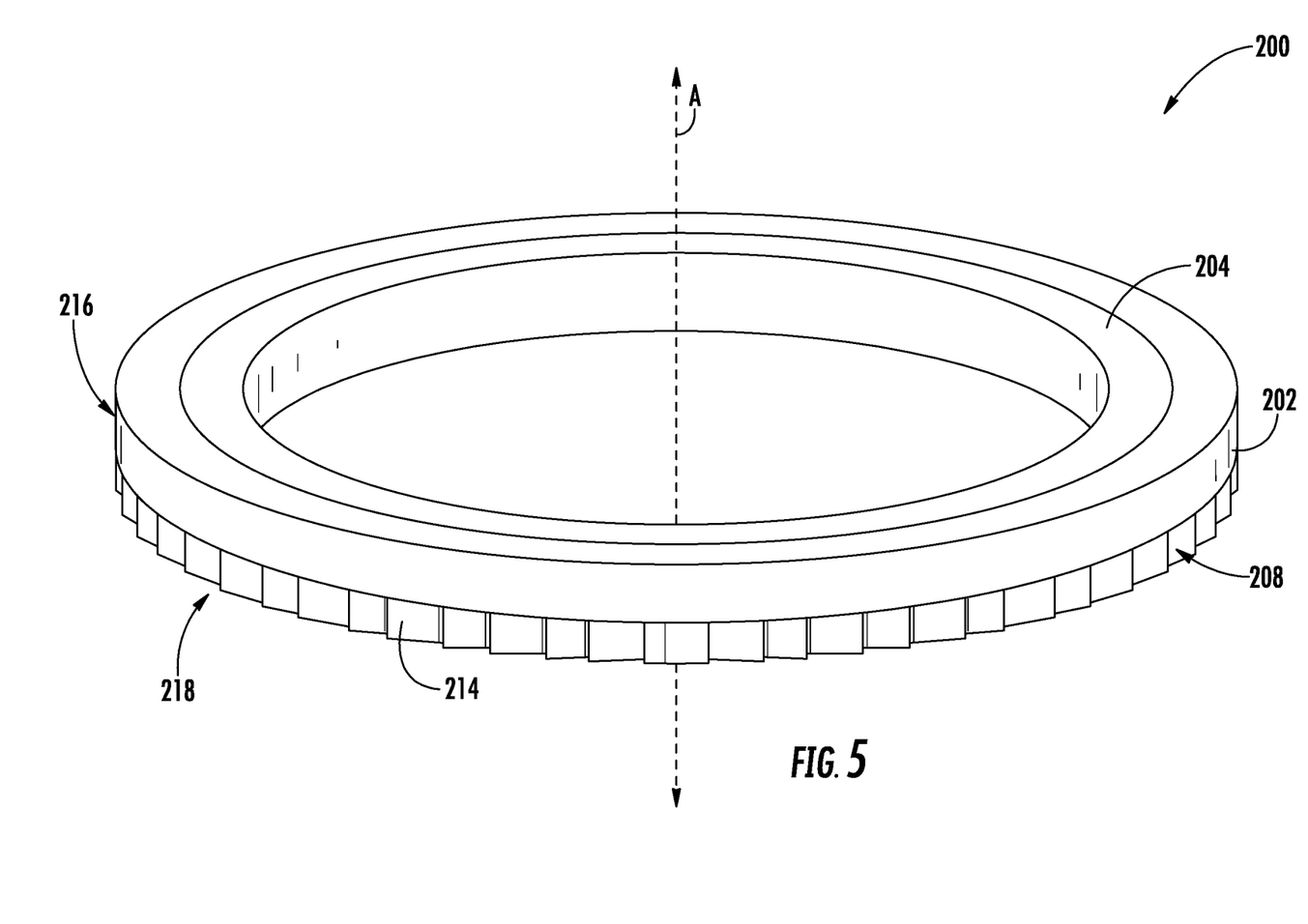
FIG. 5 illustrates a perspective view of one embodiment of a slewing ring bearing according to the present disclosure, particularly illustrating an outer race having a toothed gear portion.

In another embodiment, it should be further understood that the outer race 202 may be rotated relative to the inner race 204. For example, as shown in FIG. 5, a portion of the outer race 202 may be formed with a plurality of gear teeth 208 so as to form a toothed gear 214. It should be appreciated that the slewing ring bearing 200 may be configured in various embodiments as a pitch bearing 134 or a yaw bearing 140 of the wind turbine 100.

Figure 6:
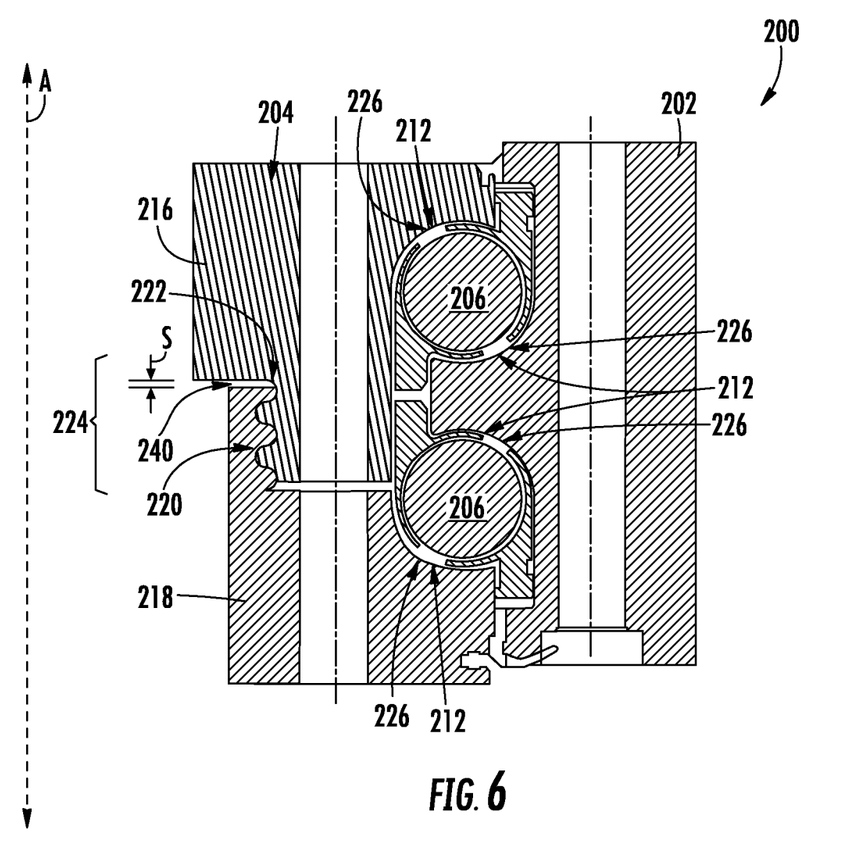
FIG. 6 illustrates a cross-sectional view of a portion of a slewing ring bearing according to the present disclosure.

Referring particularly to FIG. 6, in an embodiment, the inner and outer races 202, 204 may define one or more raceways 212. Thus, as shown, the plurality of roller elements 206 may be arranged between the raceways 212 defined by the inner and outer races 202, 204. The plurality of roller elements 206 may be any suitable rolling element, such as ball bearings, spherical rollers, cylindrical rollers, tapered rollers, or needles.

Referring back to FIGS. 4 and 5, in an embodiment, the slewing ring bearing 200 may be configured as a split-ring bearing. In such a configuration, as shown, the outer race 202 and/or the inner race 204 may be split into a first portion 216 and a separate, second portion 218. Further, as shown, the first and second portions 216, 218 may be ring-shaped and oriented on axially-aligned planes perpendicular to an axis of rotation (A). In other words, in an embodiment, wherein the slewing ring bearing 200 is oriented in a horizontal configuration, the first and second portions 216, 218 may be in a stacked configuration wherein the first portion 216 is positioned either on top of or underneath, the second portion 218.

As depicted particularly in FIG. 6, the first portion 216 and the second portion 218 may be coupled together via a threaded interface 220. More specifically, as shown, the threaded interface 220 may include a plurality of corresponding circumferential threads 222 formed in opposing portions of the first and second portions 216, 218. Thus, in an embodiment, the threaded interface 220 may be configured to facilitate drawing together of the first and second portions 216, 218. It should be appreciated that in an embodiment, the threaded interface 220 may form an interrupted screw. In such an embodiment, the corresponding circumferential threads 222 may be interrupted so as to facilitate coupling of the first and second portions 216, 218 via a 45 degree rotation on one relative to the other.

In at least one embodiment, the threaded interface 220 may be configured to minimize the likelihood of a bearing failure due to a concentration of stresses surrounding the threaded interface 220. For example, in an embodiment, the threaded interface 220 may be located in a lower-stress region 224 of the slewing ring bearing 200. As used herein, the "lower-stress region" generally refers to a region of the respective inner or outer race 202, 204 having the first and second portions 216, 218 wherein an anticipated stress concentration is less than 95% of a maximal stress concentration of the respective race. It should be appreciated that positioning the threaded interface 220 in the lower-stress region 224 may make the slewing ring bearing 200 less prone to failure than if the threaded interface 220 were placed in an area of a higher stress concentration.

In an additional embodiment, the threaded interface 220 may result in a stress concentration or stress riser. The threaded interface 220 may, however, be configured so as to have a stress concentration factor (Kt) of less than or equal to 4.0. Accordingly, the Kt may define a maximum acceptable increase in stress in the threaded interface 220. For example, if the localized stress concentration of a split-ring slewing ring bearing without a threaded interface were 5 mega pascals (MPa), then in an embodiment wherein the threaded interface 220 has a Kt of 4.0, the resultant stress concentration may not exceed 20 MPa. In order to limit an increase in stress risers in the threaded interface 220, the plurality of threads 222 may be formed so as to eliminate sharp corners. For example, as shown, the plurality of threads 222 may be formed as arcuate threads.

Figure 7A:
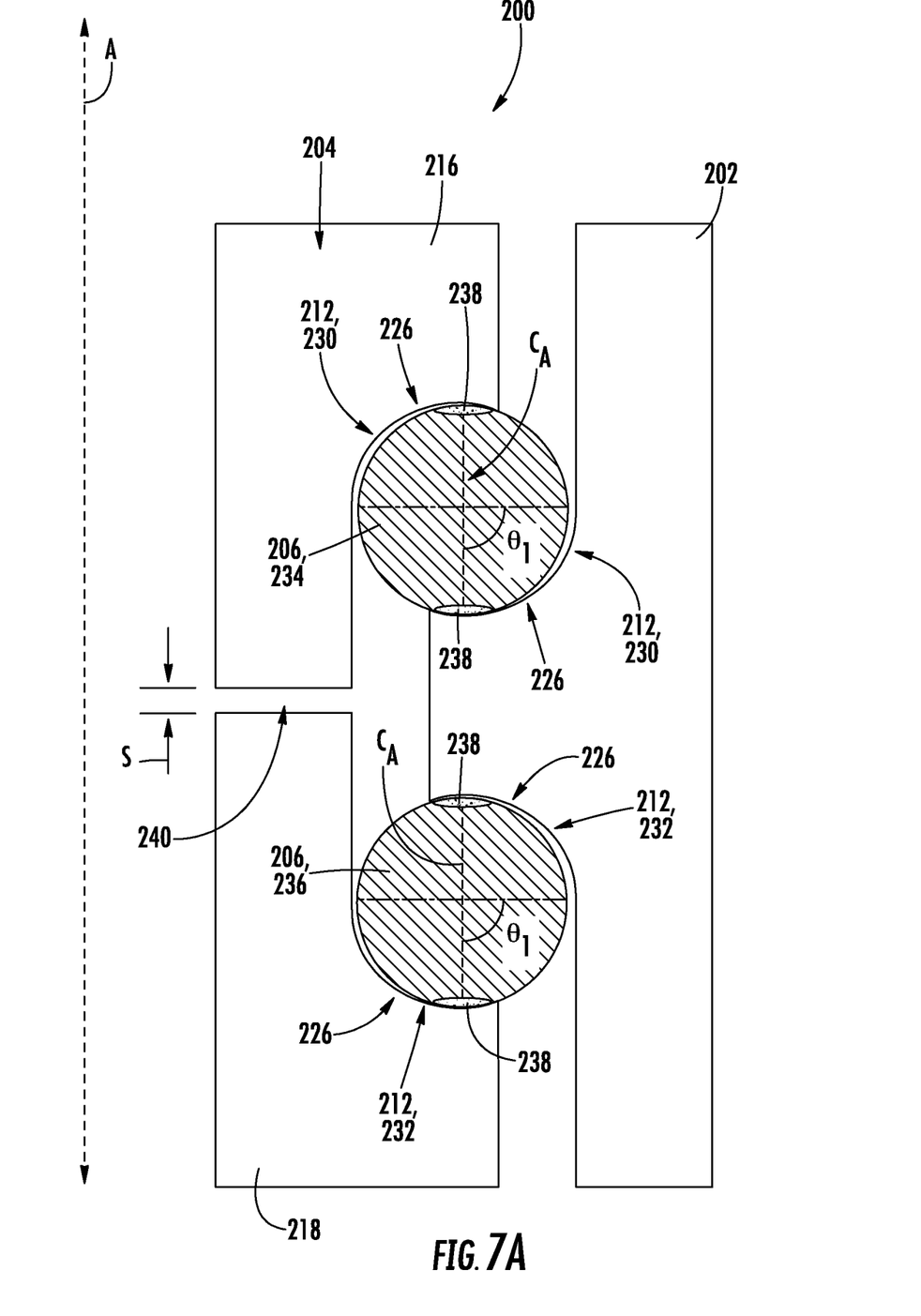
FIG. 7A illustrates a simplified cross-sectional view of a portion of the slewing ring bearing according to aspects of the present disclosure, particularly illustrating the slewing ring bearing prior to the application of a preload.
Figure 7B:
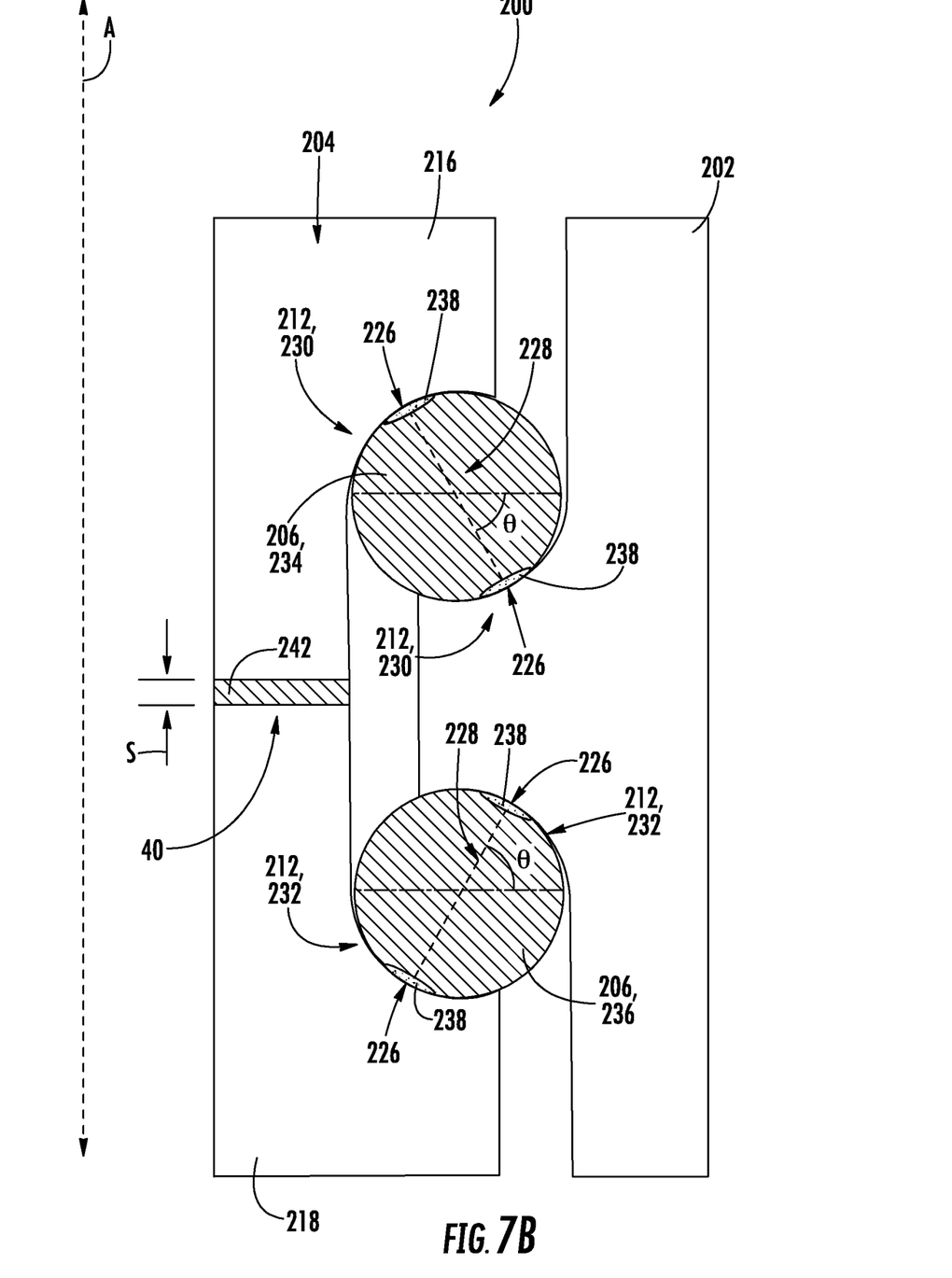
FIG. 7B illustrates a simplified cross-sectional view of a portion of the slewing ring bearing according to aspects of the present disclosure, particularly illustrating the slewing ring bearing having a predetermined preload.

Referring now to FIGS. 6, 7A, and 7B, cross-sectional views of a portion of the slewing ring bearing 200 according to aspects of the present disclosure are illustrated. As depicted, in an embodiment, the slewing ring bearing 200 may be formed as an angular contact bearing with one or more raceways 212 which are asymmetric raceways. In a typical bearing, a line of contact connecting the centers of curvatures of opposing raceways is generally oriented either parallel with, or perpendicular to the axis of rotation. As such, the raceway will typically have horizontal or vertical symmetry about the center of curvature. However, in an embodiment, wherein the slewing ring bearing 200 is configured as an angular contact bearing (e.g., a bearing having asymmetric raceways), the centers of curvature 226 of the opposing raceways 212 may be placed at reciprocal angles along a 90° arc between parallel with and perpendicular to the axis of rotation (A). Because of the placement of the centers of curvature 226 at the reciprocal angles, the raceways 212 may lack horizontal and/or vertical symmetry about the centers of curvature 226.

Still referring to FIGS. 7A and 7B, in an embodiment, the inner race 204 and/or the outer race 202 may define a first portion of a first raceway 230 and a first portion of a second raceway 232. The other of the inner race 204 or the outer race 202 may define a second portion of the first raceway 230 and a second portion of the second raceway 232. The second portion of the first raceway 230 and the second portion of the second raceway 232 may be defined by the first and second portions 216, 218 of the inner or outer race 204, 202. In an embodiment, the first raceway 230 and the second raceway 232 may form parallel raceways within the slewing ring bearing 200. Thus, in at least one embodiment, the roller elements 206 may include a first row of roller elements 234 and a second row of roller elements 236 positioned within the respective first and second raceways 230, 232.

In at least one embodiment, the raceways 212 of the slewing ring bearing 200 may be surface hardened. Surface hardening the raceways 212 may make the raceways 212 more resistant to wear and indentation. The raceways 212 may be hardened using known thermal or mechanical hardening processes, such as induction heating, laser hardening, nitriding, peening, vibration hardening, burnishing, or electron beam hardening. It should be appreciated that the threaded interface 220 should be located in a region of the slewing ring bearing 200 which is not surface hardened.

As is particularly depicted in FIG. 7B, the placement of the centers of curvature 226 of the opposing raceways 212 may define a design contact angle ($\theta$) for the raceways 212. The employment of the design contact angle ($\theta$) of an angular contact bearing may increase the ability of slewing ring bearing 200 to support a combined axial and radial load. The design contact angle ($\theta$) is established by the geometry of the raceways 212. It should be appreciated that the capacity of the slewing ring bearing 200 may be maximized when the rolling elements 206 are in contact with the raceways 212 along the design contact angle ($\theta$). It should be further appreciated that the rolling elements 206 contacting the raceways 212 at angles other than the design contact angle ($\theta$) may reduce the ability of slewing ring bearing 200 to support either an axial or radial load, such as a bending moment.

Referring still to FIGS. 7A and 7B, the rolling elements 206 may establish a contact patch, or contact ellipse 238, in a region where the rolling element 206 contacts the raceway 212. A contact axis ($C_A$) may be drawn through the center of the rolling element 206 and between opposing contact patches 238. The contact axis ($C_A$) may define a contact angle ($\theta_1$) relative to a plane either parallel or perpendicular with the axis of rotation (A). Due to clearances, or slop, between the components of the slewing ring bearing 200, the contact angle ($\theta_1$) under load may be different than the design contact angle ($\theta$). It should be appreciated that the establishment of the contact angle ($\theta_1$) which is different than the design contact angle ($\theta$) may reduce the load-carrying capacity of the slewing ring bearing 200.

In order to restrict the establishment of contact angle angles ($\theta_1$), which deviate from the design contact angle ($\theta$), the slewing ring bearing 200 may, in an embodiment, be subjected to a predetermined preload. As depicted in FIGS. 6, 7A and 7B, the threaded interface 220 may facilitate the establishment of the predetermined preload for the slewing ring bearing 200. Further, in an embodiment, advancing one of the first or second portions 216, 218 toward the other along the threaded interface 220 may reduce a separation (S) along a preload interface 240. This reduction in the separation (S) may result in establishment of a contact stress between the rolling elements 206 and the raceways 212. For example, the contact stress may be less than or equal to 2.5 GPa or may be less than or equal to 2 GPa. The contact stress may also, for example, be greater than or equal to 1.5 GPa or greater than or equal to 1.75 GPa. The contact stress may be considered to be the magnitude of the predetermined preload. Thus, the application of the preload and the establishment of the contact angle ($\theta_1$) may define a desired bearing stiffness.

The magnitude of the predetermined preload may be established by the separation (S). For example, in an embodiment wherein the separation may be eliminated by bringing the first and second portions 216, 218 into contact along the preload interface 240, the predetermined preload may be a maximal-predetermined preload and the bearing stiffness may be a maximal stiffness. Alternatively, in an embodiment, wherein the separation (S) is maintained, the predetermined preload may be a value less than the maximal-predetermined preload such that the bearing stiffness may be reduced. In an embodiment, as shown in FIG. 7B, this reduction in the predetermined preload and corresponding bearing stiffness may be achieved through the inclusion of a spacer 242 positioned between the first and second portions 216, 218 of at least one of the outer or inner races 202, 204. In such embodiments, the spacer 242 may establish a mechanical limit between the first and second portions 216, 218 along the preload interface 240.

Figure 8:
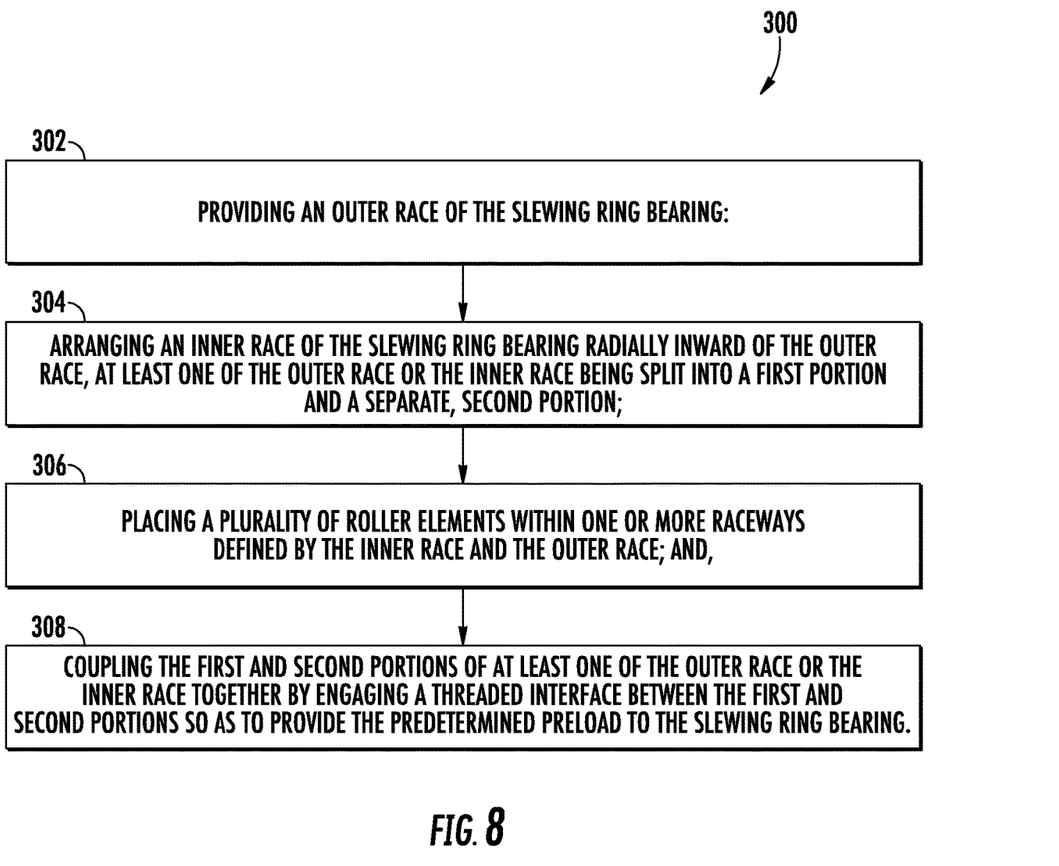
FIG. 8 illustrates a flow diagram of one embodiment of a method for assembling a slewing ring bearing with a predetermined preload according to the present disclosure.

Referring to FIG. 8, a flow diagram of one embodiment of a method 300 of assembling a slewing ring bearing with a predetermined preload is illustrated. The method 300 may be implemented using, for instance, the slewing ring bearing 200 discussed above with reference to FIGS. 3-7B. FIG. 8 depicts steps performed in a particular order for purposes of illustration and discussion. Those of ordinary skill in the art, using the disclosures provided herein, will understand that various steps of the method 300 or any of the other methods disclosed herein may be adapted, modified, rearranged, performed simultaneously or modified in various ways without deviating from the scope of the present disclosure.

As shown at (302), the method 300 includes providing an outer race of the slewing ring bearing. As shown at (304), the method 300 includes arranging an inner race of the slewing ring bearing radially inward of the outer race. At least one of the outer race or the inner race being split into a first portion and a separate second portion. As shown at (306), the method 300 includes placing a plurality of roller elements within one or more raceways defined by at least one of the inner race and or the outer race. As shown at (308), the method 300 includes coupling the first and second portions of at least one of the outer race or the inner race together by engaging a threaded interface between the first and second portions so as to provide the predetermined preload to the slewing ring bearing.

In additional embodiments, the method 300 may also, in accordance with the present disclosure, include ensuring the predetermined preload is within a specified design limit for the slewing ring bearing by performing a torque test on the assembled slewing ring bearing. In another embodiment, the method 300 may also include rotating at least one of the first portion or the second portion with respect to the other so as to advance at least one of the first portion or the second portion along the threaded interface and reduce a separation between the first and second portions. In a further embodiment, rotating at least one of the first portion or the second portion with respect to the other may include rotating the first portion or the second portion at least 45° but less than or equal to 1440°. In an additional embodiment, rotating at least one of the first portion or the second portion with respect to the other may include engaging a toothed gear of at least one of the first portion or the second portion with a pinion drive so as to apply a radial torque thereto.

In additional embodiments, the method 300 may also include establishing first and second contact angles, respectively, for the first and second row of roller elements. In yet another embodiment, the method 300 may also include establishing a contact stress between the first and second rows of roller elements and the one or more raceways of less than or equal to 2 GPa.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

For reasons of completeness, various aspects of the present disclosure are set out in the following numbered clauses:

Clause 1. A slewing ring bearing comprising:

an outer race;

an inner race rotatable relative to the outer race, at least one of the outer race or the inner race being split into a first portion and a separate, second portion; and, a plurality of roller elements arranged between one or more raceways defined by the inner and outer races, wherein the first and second portions of at least one of the outer race or the inner race are coupled together via a threaded interface therebetween so as to establish a predetermined preload for the slewing ring bearing.

Clause 2. The slewing ring bearing of clause 1, wherein the one or more raceways are asymmetric raceways.

Clause 3. The slewing ring bearing of any preceding clause, wherein the plurality of roller elements further comprise a first row of roller elements and a second row of roller elements.

Clause 4. The slewing ring bearing of clause 3, wherein the first and second rows of roller elements define first and second contact angles, respectively, the first and second contact angles being established by a design contact angle of the one or more asymmetric raceways, wherein a magnitude of the predetermined preload is established by a separation between the first and second portions of at least one of the outer race or the inner race along a preload interface, and wherein the magnitude of the predetermined preload defines a bearing stiffness.

Clause 5. The slewing ring bearing of clause 4, wherein the predetermined preload is a maximal-predetermined preload when the first and second portions of at least one of the outer race or the inner race are in contact along the preload interface.

Clause 6. The slewing ring bearing of clause 4 or 5, further comprising:

a spacer positioned between the first and second portions of at least one of the outer race or the inner race so as to establish a mechanical limit between the first and second portions along the preload interface.

Clause 7. The slewing ring bearing of any preceding clause, wherein the threaded interface is located in a lower-stress region of the outer or inner race having a stress concentration which is less than 95% of a maximal stress of the respective race.

Clause 8. The slewing ring bearing of any preceding clause, wherein the threaded interface is defined by a plurality of threads, wherein the plurality of threads comprise a plurality of arcuate threads.

Clause 9. The slewing ring bearing of any preceding clause, wherein the threaded interface comprises a stress concentration factor of less than or equal to 4.0.

Clause 10. The slewing ring bearing of any preceding clause, wherein the slewing ring bearing comprises at least one of a pitch bearing or a yaw bearing of a wind turbine.

Clause 11. A method of assembling a slewing ring bearing with a predetermined preload, the method comprising:
providing an outer race of the slewing ring bearing;
arranging an inner race of the slewing ring bearing radially inward of the outer race, at least one of the outer race or the inner race being split into a first portion and a separate, second portion;
placing a plurality of roller elements within one or more raceways defined by the inner race and the outer race; and,
coupling the first and second portions of at least one of the outer race or the inner race together by engaging a threaded interface between the first and second portions so as to provide the predetermined preload to the slewing ring bearing.

Clause 12. The method of clause 11, further comprising ensuring the predetermined preload is within a specified design limit for the slewing ring bearing by performing a torque test on the assembled slewing ring bearing.

Clause 13. The method of clause 11 or 12, further comprising rotating at least one of the first portion or the second portion with respect to the other so as to advance at least one of the first portion or the second portion along the threaded interface so as to reduce a separation between the first and second portions.

Clause 14. The method of clause 13, wherein rotating at least one of the first portion or the second portion with respect to the other further comprises rotating the first portion or the second portion at least 45° but less than or equal to 1440°.

Clause 15. The method of clause 13 or 14, wherein rotating at least one of the first portion or the second portion with respect to the other further comprises engaging a toothed gear of at least one of the first portion or the second portion with a pinion drive so as to apply a radial torque thereto.

Clause 16. The method of clause 11, 12, 13, 14, or 15, wherein the plurality of roller elements further comprise a first row of roller elements and a second row of roller elements, the method further comprising establishing first and second contact angles, respectively, for the first and second rows of roller elements.

Clause 17. The method of clause 16, further comprising establishing a contact stress between the first and second rows of roller elements and the one or more raceways of less than or equal to two (2) gigapascals (GPa).

Clause 18. A wind turbine, comprising:
a tower;
a nacelle mounted atop the tower;
a rotor mounted to the nacelle, the rotor comprising a rotatable hub having one or more rotor blades secured thereto; and,
at least one slewing ring bearing arranged between at least one of the tower and the nacelle or the rotor and one of the one or more rotor blades, the slewing ring bearing comprising:
an outer race;
an inner race rotatable relative to the outer race, at least one of the outer race or the inner race being split into a first portion and a separate, second portion; and,
a plurality of roller elements arranged between one or more raceways defined by the inner and outer races,
wherein the first and second portions of at least one of the outer race or the inner race are coupled together via a threaded interface therebetween so as to establish a predetermined preload for the slewing ring bearing.

Clause 19. The wind turbine of clause 18, wherein the plurality of roller elements further comprises a first row of roller elements and a second row of roller elements, the first and second rows of roller elements defining first and second contact angles, respectively, the first and second contact angles being established by a design contact angle of the one or more raceways, wherein a magnitude of the predetermined preload is established by a separation between the first and second portions of at least one of the outer race or the inner race along a preload interface, wherein the magnitude of the preload increases as the separation decreases, wherein the magnitude of the preload is a maximal preload when the separation is eliminated and wherein the magnitude of the predetermined preload defines a bearing stiffness.

Clause 20. The wind turbine of clause 18 or 19, wherein the threaded interface has a stress concentration factor of less than or equal to 4.0.

What is claimed is:

1. A slewing ring bearing comprising:
an outer race;
an inner race rotatable relative to the outer race, at least one of the outer race or the inner race being split into a first portion and a separate, second portion; and,
a plurality of roller elements arranged between one or more raceways defined by the inner and outer races,
wherein the first and second portions of at least one of the outer race or the inner race are coupled together via a threaded interface therebetween so as to establish a predetermined preload for the slewing ring bearing, the threaded interface comprising a plurality of corresponding circumferential threads formed in each of the first and second portions so that the threads in the first portion engage the threads on the second portion.

2. The slewing ring bearing of claim 1, wherein the one or more raceways are asymmetric raceways.

3. The slewing ring bearing of claim 2, wherein the plurality of roller elements further comprise a first row of roller elements and a second row of roller elements.

4. The slewing ring bearing of claim 3, wherein the first and second rows of roller elements define first and second contact angles, respectively, the first and second contact angles being established by a design contact angle of the one or more asymmetric raceways, wherein a magnitude of the predetermined preload is established by a separation between the first and second portions of at least one of the outer race or the inner race along a preload interface, and wherein the magnitude of the predetermined preload defines a bearing stiffness.

5. The slewing ring bearing of claim 4, wherein the predetermined preload is a maximal-predetermined preload when the separation is eliminated due to the first and second portions of at least one of the outer race or the inner race being in contact along the preload interface.

6. The slewing ring bearing of claim 4, further comprising:
a spacer positioned between the first and second portions of at least one of the outer race or the inner race so as to establish a mechanical limit between the first and second portions along the preload interface.

7. The slewing ring bearing of claim 1, wherein the threaded interface is located in a lower-stress region of the outer or inner race having a stress concentration which is less than 95% of a maximal stress of the respective race.

8. The slewing ring bearing of claim 1, wherein the plurality of threads comprise a plurality of arcuate threads.

9. The slewing ring bearing of claim 1, wherein the threaded interface comprises a stress concentration factor of less than or equal to 4.0.

10. The slewing ring bearing of claim 1, wherein the slewing ring bearing comprises at least one of a pitch bearing or a yaw bearing of a wind turbine.

11. A wind turbine, comprising:
a tower;
a nacelle mounted atop the tower;
a rotor mounted to the nacelle, the rotor comprising a rotatable hub having one or more rotor blades secured thereto; and,
at least one slewing ring bearing arranged between at least one of the tower and the nacelle or the rotatable hub and one of the one or more rotor blades, the slewing ring bearing comprising:
an outer race;
an inner race rotatable relative to the outer race, at least one of the outer race or the inner race being split into a first portion and a separate, second portion; and,
a plurality of roller elements arranged between one or more raceways defined by the inner and outer races, wherein the first and second portions of at least one of the outer race or the inner race are coupled together via a threaded interface therebetween so as to establish a predetermined preload for the slewing ring bearing, the threaded interface comprising a plurality of corresponding circumferential threads formed in each of the first and second portions so that the threads in the first portion engage the threads on the second portion.

12. The wind turbine of claim 11, wherein the plurality of roller elements further comprises a first row of roller elements and a second row of roller elements, the first and second rows of roller elements defining first and second contact angles, respectively, the first and second contact angles being established by a design contact angle of the one or more raceways, wherein a magnitude of the predetermined preload is established by a separation between the first and second portions of at least one of the outer race or the inner race along a preload interface, wherein the magnitude of the preload increases as the separation decreases, wherein the magnitude of the preload is a maximal preload when the separation is eliminated, and wherein the magnitude of the predetermined preload defines a bearing stiffness.

13. The wind turbine of claim 11, wherein the threaded interface has a stress concentration factor of less than or equal to 4.0.

14. A method of assembling a slewing ring bearing with a predetermined preload, the method comprising:
providing an outer race of the slewing ring bearing;
arranging an inner race of the slewing ring bearing radially inward of the outer race, at least one of the outer race or the inner race being split into a first portion and a separate, second portion;
placing a plurality of roller elements within one or more raceways defined by the inner race and the outer race; and,
coupling the first and second portions of at least one of the outer race or the inner race together by engaging a threaded interface between the first and second portions so as to provide the predetermined preload to the slewing ring bearing, the threaded interface comprising a plurality of corresponding circumferential threads formed in each of the first and second portions so that the threads in the first portion engage the threads on the second portion.

15. The method of claim 14, further comprising ensuring the predetermined preload is within a specified design limit for the slewing ring bearing by performing a torque test on the assembled slewing ring bearing.

16. The method of claim 14, wherein coupling the first and second portions of at least one of the outer race or the inner race together by engaging a threaded interface between the first and second portions further comprises rotating at least one of the first portion or the second portion with respect to the other so as to advance at least one of the first portion or the second portion along the threaded interface so as to reduce a separation between the first and second portions.

17. The method of claim 16, wherein rotating at least one of the first portion or the second portion with respect to the other further comprises rotating the first portion or the second portion at least 45° but less than or equal to 1440°.

18. The method of claim 16, wherein rotating at least one of the first portion or the second portion with respect to the other further comprises engaging a toothed gear of at least one of the first portion or the second portion with a pinion drive so as to apply a radial torque thereto.

19. The method of claim 14, wherein the plurality of roller elements further comprise a first row of roller elements and a second row of roller elements, the method further comprising establishing first and second contact angles, respectively, for the first and second rows of roller elements.

20. The method of claim 19, further comprising establishing a contact stress between the first and second rows of roller elements and the one or more raceways of less than or equal to two (2) gigapascals (GPa).

* * * * *